United States Patent [19]
Cabrera-Montante

[11] Patent Number: 5,667,552
[45] Date of Patent: Sep. 16, 1997

[54] MACHINE TO CUT-OFF AN END OF A HOLLOW GLASSWARE ARTICLE

[75] Inventor: Armando Cabrera-Montante, Col. El Roble, Mexico

[73] Assignee: Vitrocrisa, S.A. De C.V., Nuevo Leon, Mexico

[21] Appl. No.: 520,380

[22] Filed: Aug. 29, 1995

[51] Int. Cl.$^6$ .............................. C03B 9/46; C03B 21/00; C03B 23/26

[52] U.S. Cl. .................................. 65/174; 65/112; 65/113; 65/105

[58] Field of Search ............................. 65/174, 112, 113, 65/166, 105

[56] References Cited

U.S. PATENT DOCUMENTS 4,572,732  2/1986  Gomez-Sanchez et al. .............. 65/271

*Primary Examiner*—Donald E. Czaja
*Assistant Examiner*—Jacqueline A. Ruller
*Attorney, Agent, or Firm*—Abelman, Frayne & Schwab

[57] ABSTRACT

A machine to automatically cut-off one end of a cylindrical hollow glassware article, comprising: a support structure including a shaft; an intermittent rotary driving mechanism mounted on the shaft, providing a plurality of positions corresponding to article charging, cut-off, fire finishing and discharge positions; a lower intermittent rotary table mounted on said shaft and rotary coupled to the intermittent rotary driving mechanism, including a plurality of burners equally distributed on its periphery, to cut-off a leftover piece at a lower end of the article and fire finishing the cut-off end thereof within a cut-off cycle; an upper intermittent rotary table coupled to said lower table, comprising a plurality of chuck supporting and actuating mechanisms, equally mounted thereon, each including a chuck having fingers to grip an upper end of the article at a charging position, bring down the gripped article at a cut-off position placing its leftover piece in a burner to be cut-off and fire finished and lift and discharge the finished article at a discharge position; and a continuously rotary driving mechanism to rotate the chuck and article gripped thereby through the cut-off and fire finishing positions.

15 Claims, 9 Drawing Sheets

MACHINE TO CUT-OFF AN END OF A HOLLOW GLASSWARE ARTICLE

BACKGROUND OF THE INVENTION

A. Field of the Invention

This invention relates to a machine to automatically cut-off one end of a hollow glassware article and, more specifically, to an intermittent rotary machine to rotary grip the first cut-off opened end of a tubular article and cut-off the second end thereof.

B. Description of the Related Art

In the production of seamless hollow tubular glassware articles such as glass tubes for oil lamps, produced by the press-and-blow process in the so known paste molds, the glassware articles are produced firstly as a parison having a closed bottom and an opened neck which is gripped by a rotary neck ring and rotated within the paste mold to blow a seamless semi-finished article.

Said semi-finished article having therefor a leftover or excess section at its opened neck end corresponding to the section which was gripped by the neck ring of the forming machine, as well as a closed bottom end which allowed the article to be blown and shaped, both of which sections have to be cut-off and fire finished to produce a tubular glassware article open at by both of its ends.

There is a well known Japanese continuously rotary automatic machine to cut-off the leftover section of the opened neck end of said tubular glassware article.

Said continuously rotary automatic machine includes a lower continuously rotary table having twelve two-halves annular burners formed by two semi-annular pieces which are opened and closed around a leftover section of the article to cut it off and fire finish it while rotating around the machine; and an upper continuously rotary table having twelve suction cups equally mounted thereon, each suction cup grips an article necessarily by its closed bottom end at a charging position, lowering and continuously rotating the article to place the leftover section of its opened neck end on a position wherein a corresponding burner closes around it to be cut-off while rotating in said suction cup and around the machine, and finally lifting and stopping the rotation of the article, once the leftover section has been cut-off, to leave it at a discharging position.

The continuous rotation of this machine is provided by a continuously rotary motor which in turn transmits its continuous rotary movement to the chucks through a clutching mechanism traveling in said rotary machine and geared to a stationary chain.

Because of the suction cups of the above disclosed machine, the article necessarily has to be gripped by its closed bottom end to allow the suction gripping action thereon, it in turn to cut-off the leftover section of the opened neck end of the article.

Therefore, said machine is not useful to cut-off the closed bottom end of the article because the suction cups cannot grip the opened neck end thereof.

Consequently, in the previous art, it was necessary to provide at least three semi-automatic cut-off machines each having two cut-off stations, to grip the cuto-ff opened neck end of the article and cut-off the closed bottom end thereof.

Each of said cut-off stations including a two-halves annular burner which is hand-closed by the operator when receiving an article and hand-opened once the closed bottom of the article has been cut-off and fire finished; a chuck having hand-operating fingers which are hand-opened by the operator by means of an actuator to receive and grip the opened neck of the article; and a continuously rotary clutching mechanism to clutch said chuck imparting it the necessarily continuous rotary motion and allow the closed bottom end of the article to be cutoff and fire finished.

During these operations, the operator carefully places the article in a vertical position maintaining a relative eccentricity of the article in relationship with the burner, to obtain the correct cut off the angle within the specifications.

The reliability of these adjustments wholly depended on the ability of the operator because the machine has no sizing tools.

The disadvantages of the Japanese continuously rotary machine are mainly that, as the machine is continuously rotating, it has no time to properly charge an article in a right position regarding the suction cup, consequently providing a cut-off which is not absolutely perpendicular to the central axes of the article.

Regarding the disadvantages of the manual cut-off machines to make the second cut-off (of the closed bottom end) of the article, the manual charge of the article by the operator to the suction cups, causes an unreliable position the perpendicular with the central axis of the article and in its rotation, resulting in cut-off irregularities such as undulations.

Furthermore, the time of the cut-off and fire finishing depend on the ability of the operator, resulting in edges of different width affecting the size and verticality of the article.

The absence of automatic means to control the cut-off and fire finishing cycles caused also a great loss of gaseous fuel and energy.

All of these disadvantages caused the impossibility to continuously process all the tubular glassware articles produced by the forming machine, in fact these machines could cut-off only about 40% of the produced articles being necessary to have about a 60% backlog of articles in stock, to be processed in an additional time.

Additionally, the manual charge and processing of the articles, causes a great loss of product reaching about 30% of the produced articles.

Last but not least, another disadvantage of the manual machines is the number of skilled required to handle the machines which were about 10 on each working period.

The machine to automatically cut-off one end of a hollow glassware article, in accordance with the present invention, overcomes all of those disadvantages of the prior art machines, because it is absolutely automatic and can be used to cut-off both ends of the articles, and comprises: a support structure including a shaft; an intermittent rotary driving mechanism mounted on the shaft, a plurality of positions corresponding to article charging, cut-off, fire finishing and discharge positions; a lower intermittent rotary table mounted on said shaft and rotary coupled to the intermittent rotary driving mechanism, including a plurality of burners equally distributed on its periphery, to cut-off a leftover piece at a lower end of the article and fire finishing the cut-off end thereof within a cut-off cycle; an upper intermittent rotary table coupled to said lower table, comprising a plurality of chuck supporting and actuating mechanisms, equally mounted thereon, each including a chuck having fingers to grip an upper end of the article at a charging position, bring down the gripped article at a cut-off position placing its leftover piece in a burner to be cut-off and fire finished and lift and discharge the finished article at a discharge position; and a continuously rotary driving mechanism to rotate the chuck and article gripped thereby through the cut-off and fire finishing positions.

Furthermore, because of its intermittent rotary movement, the quality and production volumes are greatly increased, allowing to process substantially all the glassware production of the forming machine without backlog.

SUMMARY OF THE INVENTION

It is therefore a main object of the present invention, to provide a machine to automatically cut-off one end of a tubular hollow glassware article, in particular to grip the open end of a tubular glassware article, to cut-off the second closed end thereof.

It is also a main object of the present invention, to provide a machine to automatically cut-off one end of a hollow glassware article of the above disclosed nature which, because of its intermittent rotary movement, allows it properly and reliably cut-off and fire finish tubular hollow glassware articles keeping a precise verticality with the central axes of the articles.

It is still a main object of the present invention, to provide a machine to automatically cut-off one end of a hollow glassware article of the above disclosed nature, to produce articles having a precisely desired length, right angled cut-off ends and finished ends.

It is an additional main object of the present invention, to provide a machine to automatically cut-off one end of a hollow glassware article of the above disclosed nature, which can be used to cut-off a first end of the tubular glassware article, and then the second end thereof in an arrangement of two consecutive machines.

It is a further main object of the present invention, to provide a machine to automatically cut-off one end of a hollow glassware article of the above disclosed nature, in order to simultaneously process all the amount of tubular glassware articles produced by the forming machine without the necessity to stock a high percentage of waiting articles to be processed.

Last but not least, it is still an additional main object of the present invention, to provide a machine to automatically cut-off one end of a hollow glassware article of the above disclosed nature, that will greatly increase the quality of the tubular glassware articles and maintain its uniform quality characteristics.

These and other objects and advantages of the present invention will be apparent from the following description of the specific embodiments of the invention, provided in combination with the accompanying drawings.

DESCRIPTION OF THE SPECIFIC EMBODIMENTS OF THE INVENTION

The machine to automatically cut-off one end of a hollow glassware article, in accordance with the present invention, will be described in the following, referring to specific embodiments thereof, shown in the accompanying drawings in which the same reference numbers corresponding to the same parts of the shown drawings.

Figure 1A:
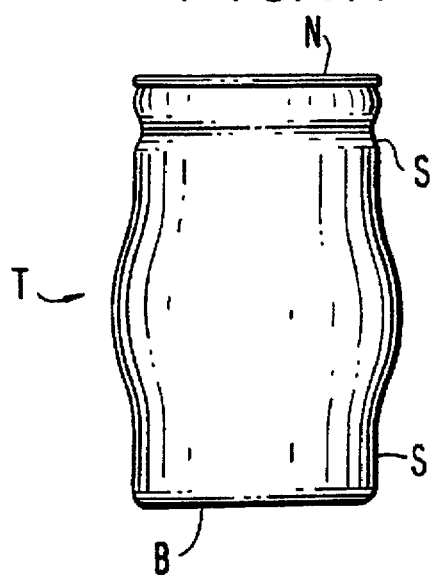
FIG. 1A is an elevation front view of one type of tubular glassware article to be cut-off.
Figure 1B:
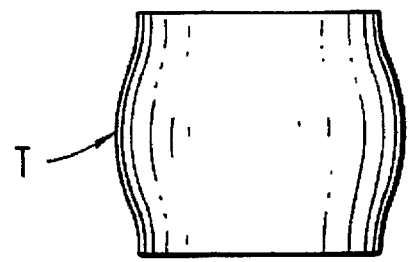
FIG. 1B is an elevation view of a finished cut-off article.
Figure 2:
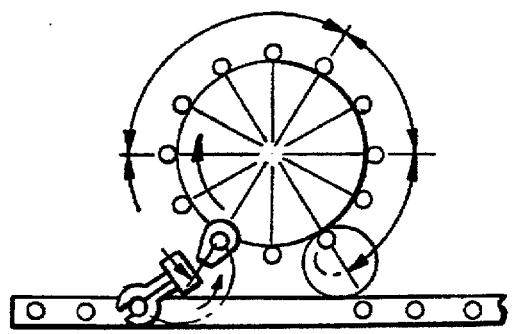
FIG. 2 is a schematic plan view of the machine to automatically cut-off one end of a hollow glassware article, in accordance with the present invention, showing its charging, cut-off, fire finishing and discharge positions.

Tubular glassware articles of the type illustrated in FIG. 1, specifically glass tubes T for oil lamps, as are normally produced by the press-and-blow or blow-and-blow forming machines, comprising a first opened neck N and a second closed bottom end B, both of which may have a leftover piece S to be independently cut-off.

Figure 3:
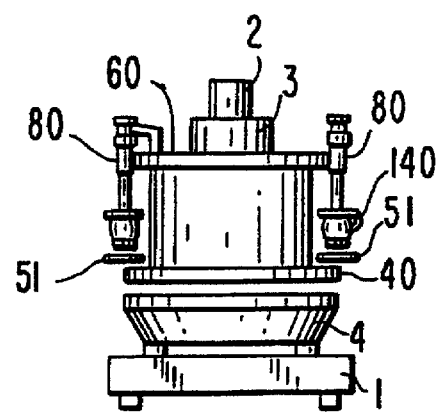
FIG. 3 is a schematic elevation view of the machine to automatically cut-off one end of a hollow glassware article, in accordance with the present invention.
Figure 4:
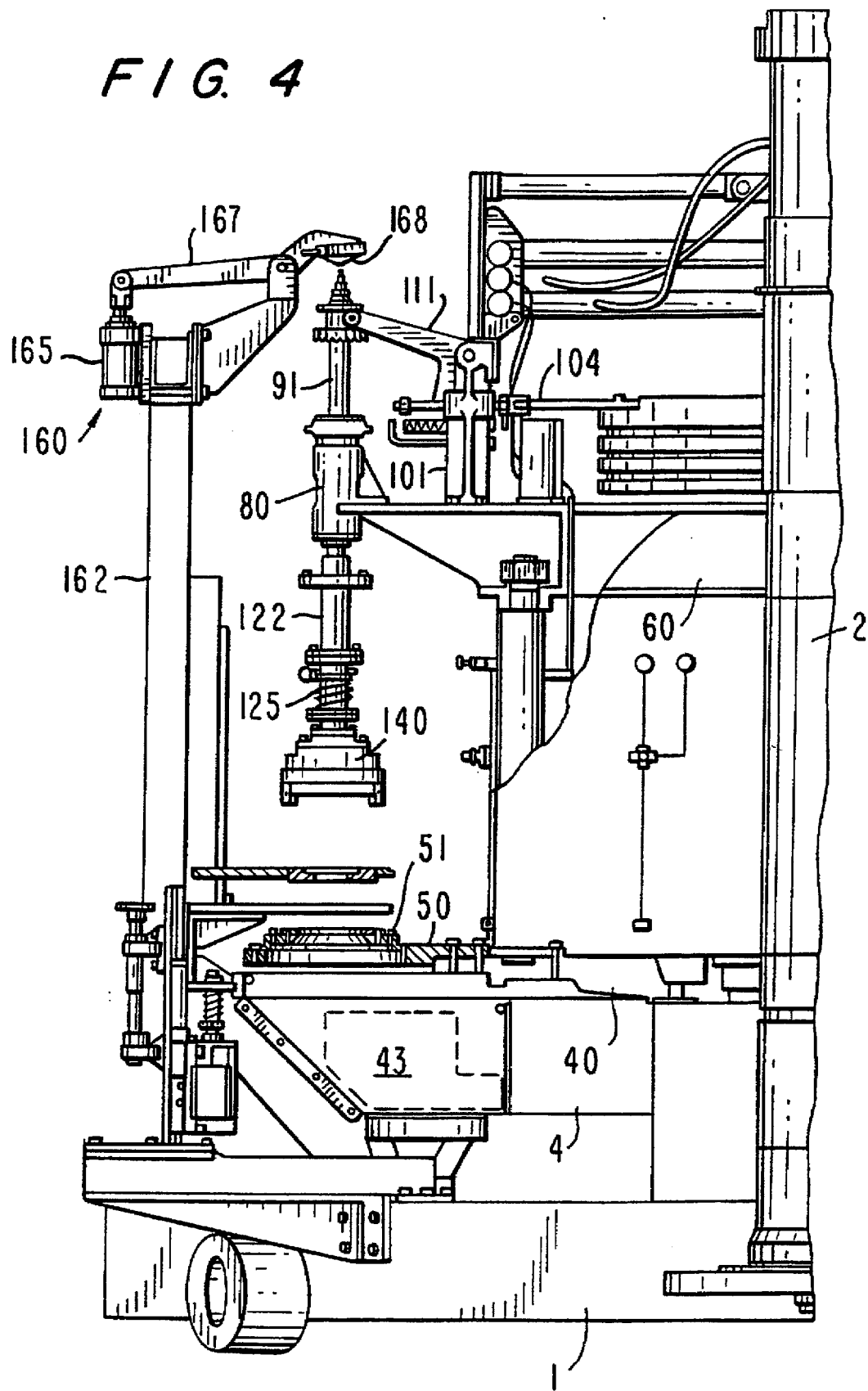
FIG. 4 is a detailed partially cut-away and sectioned elevation view of a half of the machine of FIG. 3.
Figure 5:
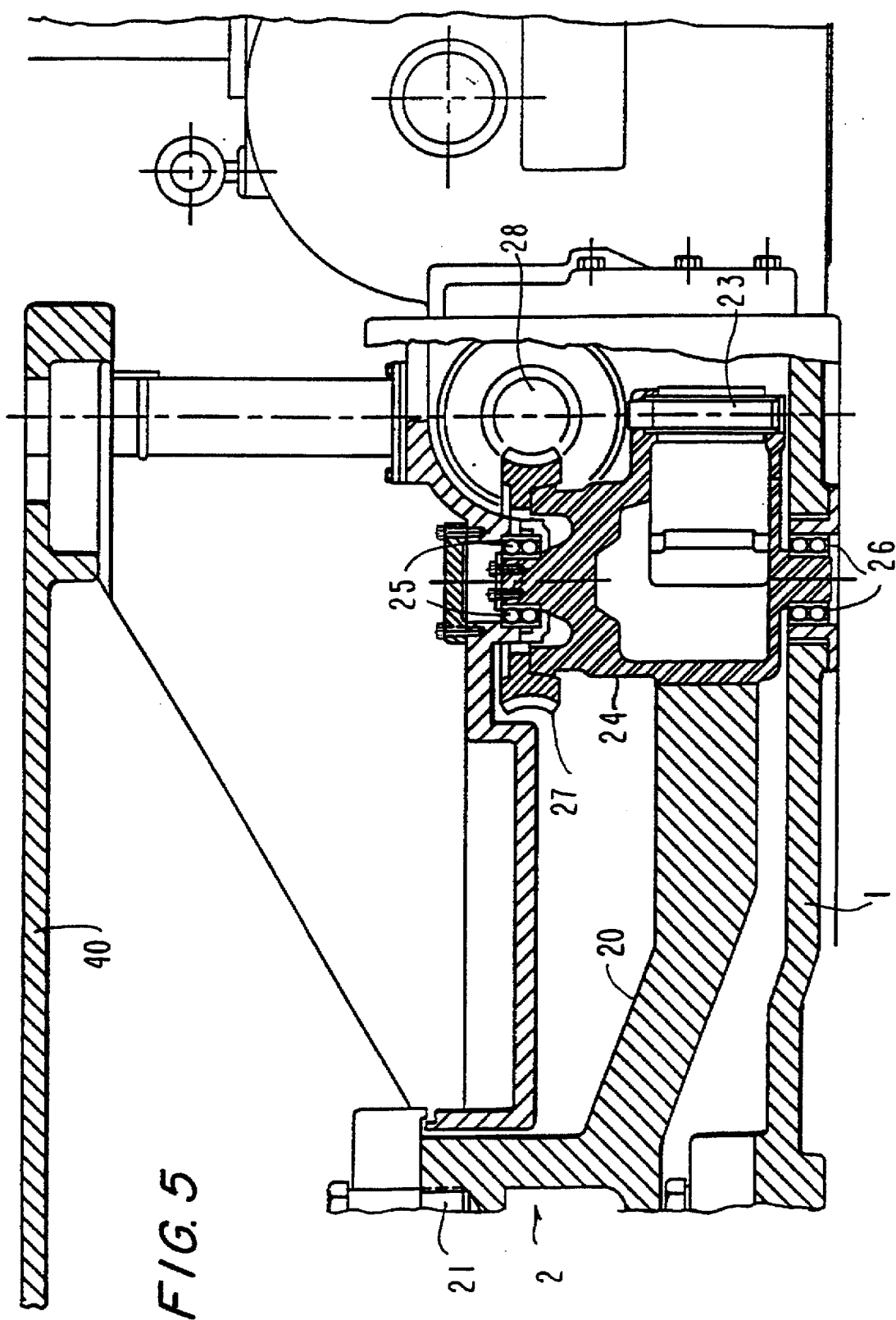
FIG. 5 is a cut-away and sectioned elevation view of a half of the support structure and intermittent rotary arrangement of the machine of FIG. 4.
Figure 6:
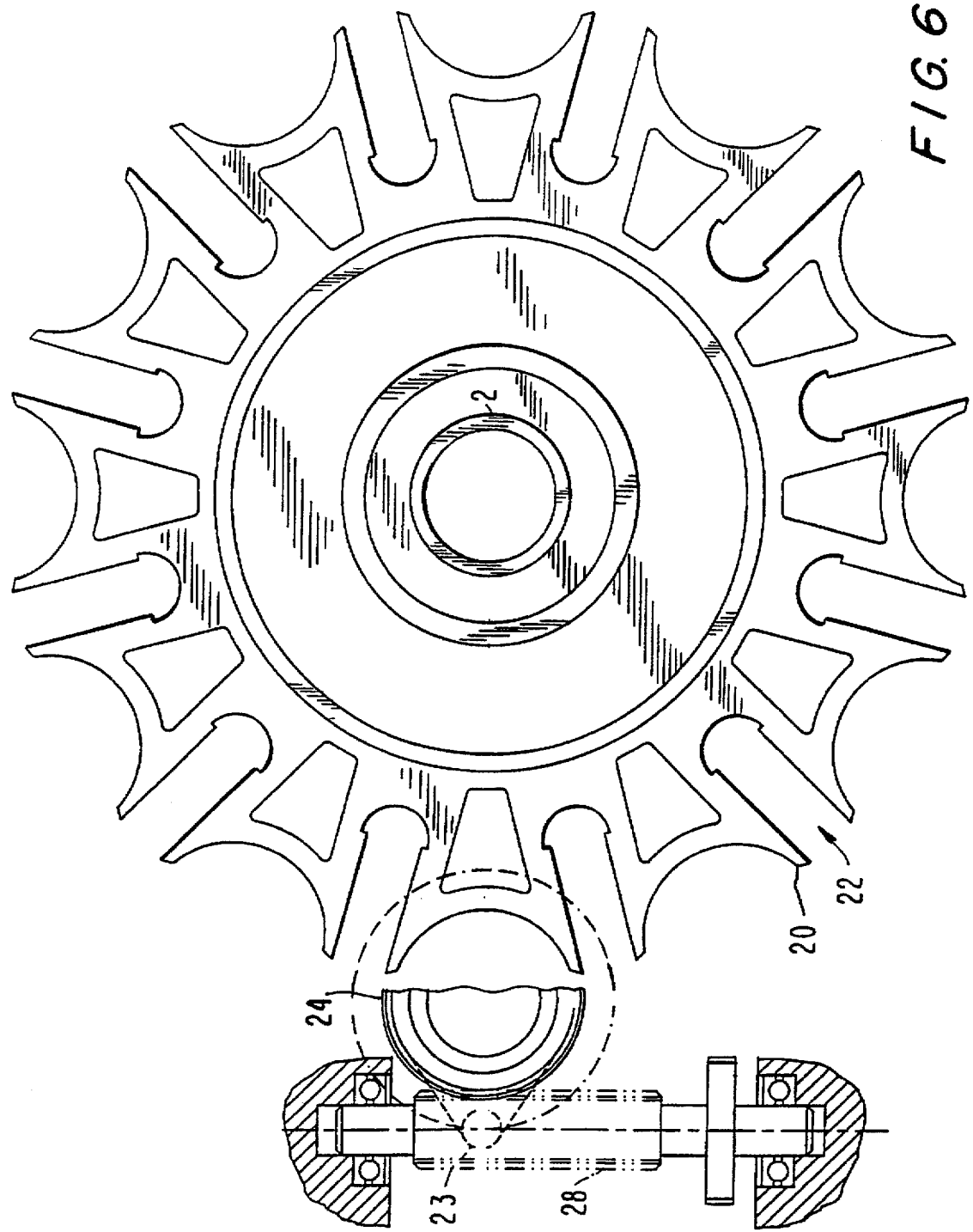
FIG. 6 is a detailed plan view of the intermittent rotary mechanisms of the support structure and intermittent rotary arrangement of FIG. 5.
Figure 7:
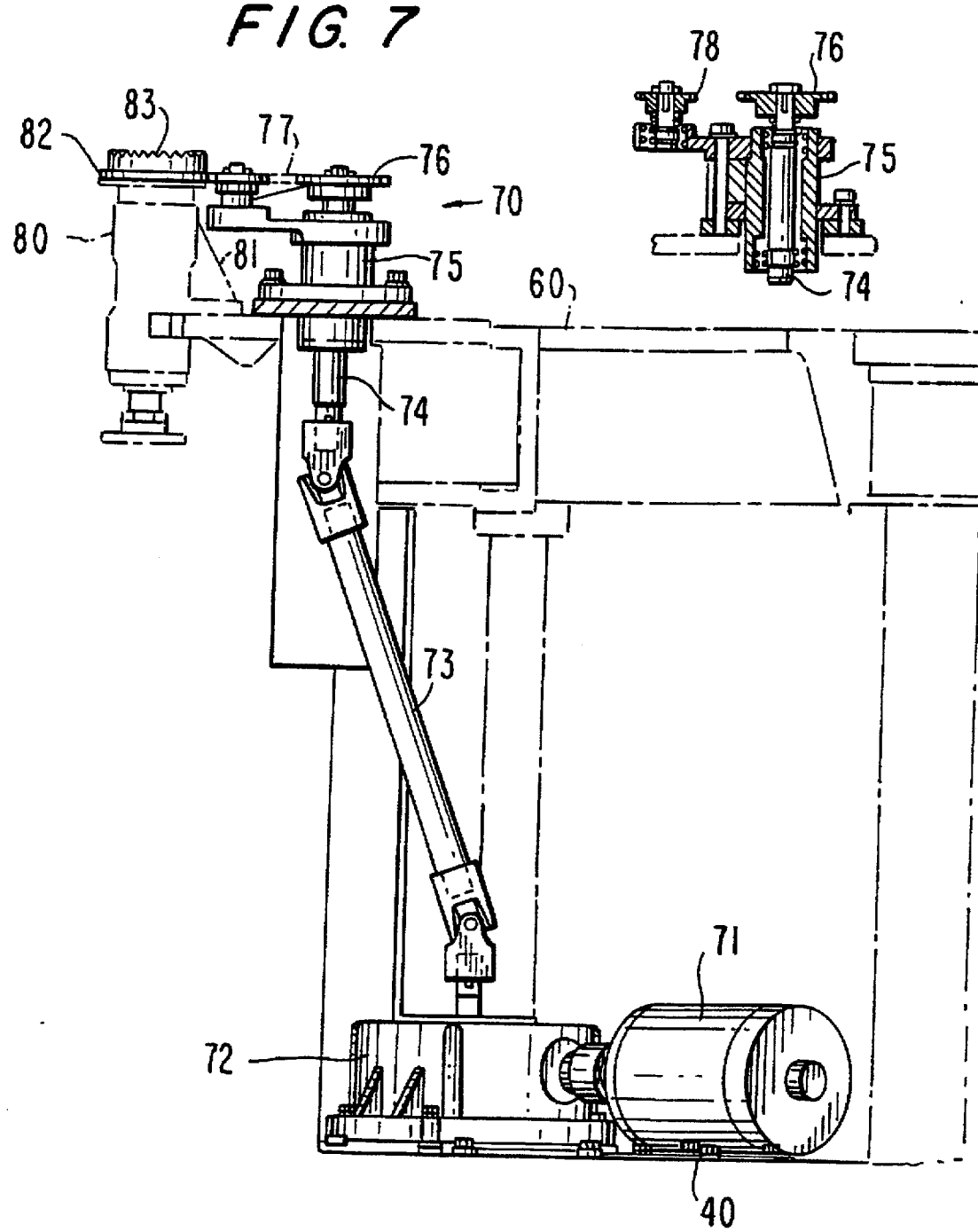
FIG. 7 is an elevation detailed view of the chuck support and driving mechanism of the machine of FIG. 4 including a detailed view of the driving mechanism.
Figure 8:
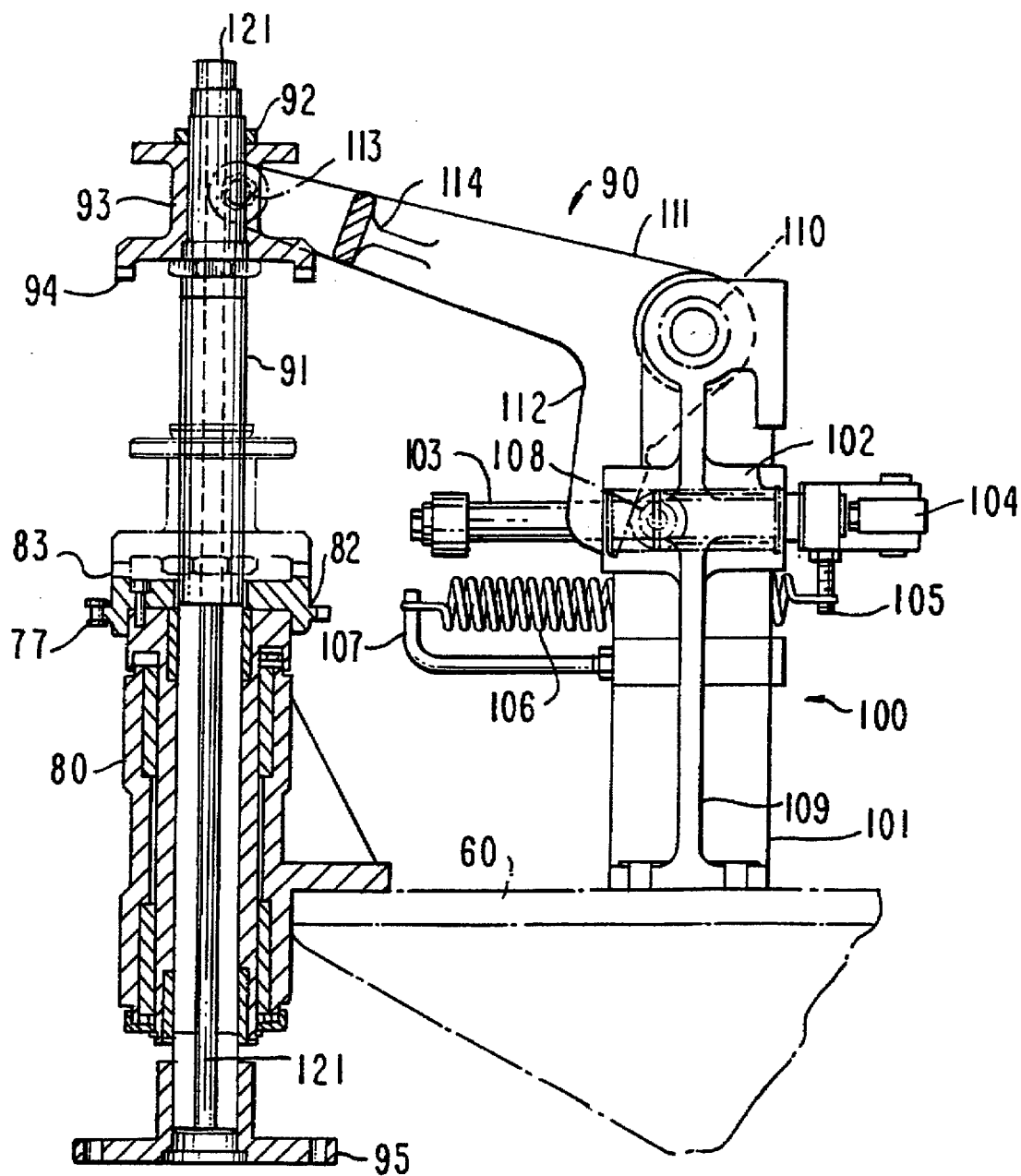
FIG. 8 is a partially cut-off elevation view of the chuck driving and chuck actuating and holding mechanisms with rotary clutching mechanism, of the machine of FIG. 4.
Figure 9A:
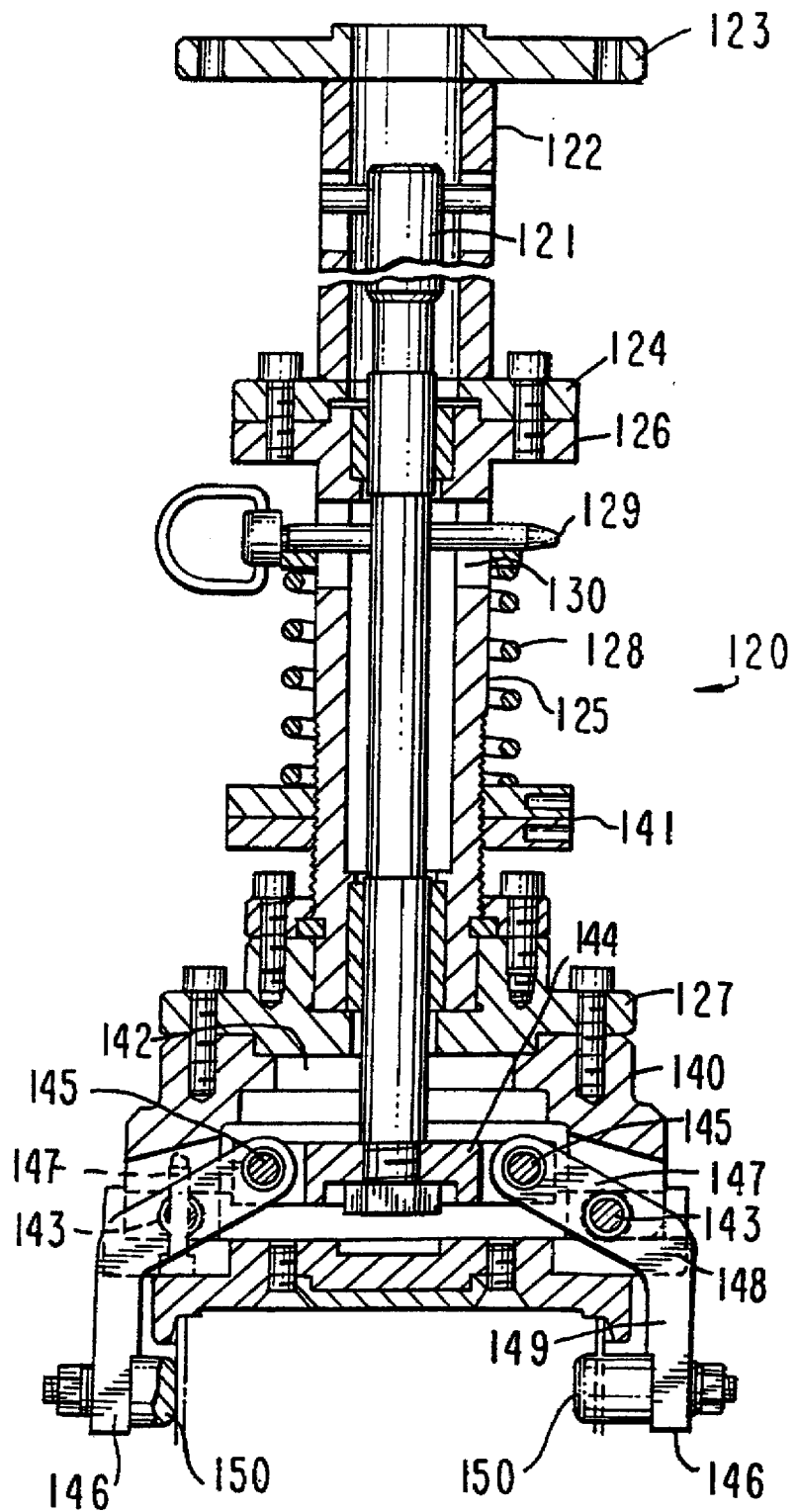
FIGS. 9A and 9B are cross section elevation views of two embodiments of the chuck carrier and operating mechanisms of the machine of FIG. 4.

The machine will also be described referring to each of its specific component mechanisms, illustrated in the drawings, and which can be used to sequentially cut-off the leftover piece S of both ends N and/or B of a tube T, comprising:
Support Structure:
  a support structure (FIGS. 3 to 5) including a circular base 1, a stationary vertical shaft 2 having an upper end and a lower end centrally mounted on the base 1, a manifold 3 at the upper end of the vertical shaft 2, to provide control signals and electrical energy to the driving components of the machine, and a circular pan 4 for collecting cut-off pieces S of the tubes T;
Intermittent driving means:
  a Geneva-type cam 20. (FIGS. 5 and 6) rotary mounted on the vertical shaft 2 of base I by means of a bearing 21, having a plurality of slots 22 (FIG. 6), normally twelve slots corresponding to twelve cut off positions or stations of a cut-off cycle, to be actuated by a cam follower 23 of a rotor 24 mounted between an upper bearing 25 and a lower bearing 26 on the base 1; the rotor 24 is geared to a gear ring 27 mounted on the base 1, which in turn is geared to a worm gear 28 coupled to a continuously driving source (not illustrated); this Geneva-type cam 20 transforms the continuously rotary motion provided by the rotor 24, to an intermittent rotary motion, each time that the cam follower 23 of the continuously rotating rotor 24 is coupled to each of the slots 22 of the Geneva-type cam 20 imparting it an intermittent rotary movement at twelve positions defining a cut-off cycle including: a first position to receive and grip a tube T by its opened neck end N, a second position for preparing it to the cut-off stage, a third, fourth fifth sixth and seventh positions to carry out the cut-off stage of a left over piece S of the closed bottom end B, an eighth and ninth positions for fire finishing the lower cut-off bottom end B, a tenth position for preparing the discharge of the tube T, an eleventh position to discharge the tube T on a take over unit, and a twelfth position to prepare reception of another tube T, and begin a new cut-off cycle;

Lower intermittent rotary table:
  a lower intermittent rotary table 40 (FIGS. 3, 4 and 5) rotary mounted at an intermediate position of the vertical shaft 2 by means of a bearing and rotary coupled on the Geneva-type cam 20 by means of screws to be intermittently rotated by said cam 20, and having a sweep plate 43 coupled to this table 40, to sweep the cut-off leftover pieces S from the pan 4 to send them to a cullet deposit (not illustrated);

Cut-off means:
  the lower intermittent rotary table 40 including twelve burner carriers 50 (FIGS. 3 and 5) equally distributed and held on the periphery of said table 40, each burner carrier 50 including an annular cut-off burner 51 connected to a gas source (not illustrated) providing an annular flame to cut-off said leftover piece S from the bottom B of the tube T, and fire finishing the cut-off end of the tube T;

Upper intermittent rotary table:
  an upper intermittent rotary support table 60 mounted near the upper end of the shaft 2 by a bearing and coupled to the lower intermittent rotary table 40 by screws to be intermittently driven by this lower intermittent rotary table 40;

Continuously rotary driving means:
  a continuously rotary driving mechanism 70 (FIG. 7), including a motor 71 mounted on the lower intermittent rotary table 40, imparting a continuously rotary movement, through a reducer 72, to a cardan bar 73 and therefrom to a shaft 74 retained by a bearing sleeve 75 mounted on the upper rotary table 60; this shaft 74 imparts a continuously rotary movement to a driving sprocket 76 coupled to an upper end of said shaft 74, and which carries a chain 77 which is maintained in tension by a tension adjusting gear 78 supported by the bearing sleeve 75, to transmit the continuously rotation to the sprocket 76 and chain 77;

Chuck driving means:
  twelve chuck driving bearing sleeves 80 (FIGS. 7 and 8), each of which is equidistantly mounted on the periphery of said upper table 60, by means of a flange 81; a rotary sprocket 82 rotary mounted on the bearing sleeve 80, which is continuously rotated by the continuously rotary chain 77 and including an annular gear 83;

Chuck actuating and gripping means
  twelve chuck retaining mechanisms 90 (FIG. 8), each held and actuated by a clutching mechanism 100, equidistantly mounted near the periphery of the upper intermittent rotary table 60, in alignment with a corresponding driving sleeve 80, in a manner which will be explained in the following;
  each of the chuck retaining mechanisms 90 including a central hollow shaft 91 slide passing through the bearing sleeve 80 and having an upper support flange 92 which is supported by a holding bearing sleeve 93 having an annular gearing 94 at its lower end, to be coupled to the annular gear 83 of the rotary sprocket 82 of the driving bearing sleeve 80, and a retaining flange 95 at a lower end of the hollow shaft 91, to retain the respective chucks which will be described afterwards;
  each of the twelve rotary chuck clutching mechanisms 100 including a hollow support column 101 mounted near the periphery of said upper rotary table 60, retaining a horizontal sliding sleeve 102 at its upper end, through which slide passing a horizontal cam follower 103 normally pushed against a rotary cam 104 which includes a circular edge profile having a peak section and a lower section providing a cut-off cycle to the machine; the cam follower 103 includes a pivot 105 to which is coupled an end of a spring 106 held by a spring carrier 107 coupled to column 101 retaining the other end of spring 106, to cushion the actuation of the cam follower 103 abutting against the rotary cam 104; a support rolling bearing 108 at about the middle part the cam follower 103 to transmit the horizontal sliding movement to an element which will be described in the following; a support column 109 centrally retained within said hollow support column 101, which has a joint 110 at its upper end; a support arm 111 which is articulate mounted on said joint 110, having a trigger 112 resting against the support rolling bearing 108 of the cam follower 103, said support arm 111 holds the bearing 93 which in turn holds said central hollow shaft 91 of said chuck retaining mechanism 90, normally pushing the trigger 112 against the rolling bearing 108 of said cam follower 103 forcing it to follow the profile of said cam 104, because of the weight of said chuck retaining mechanism 90, so that, when said cam follower is following the upper section of the cam 104, at the first and second positions, picking up a first tube T, the arm 111 is at an upper position and, when the cam follower 103 reaches to the lower section of said cam 104 at the third position of the cut-off cycle, the arm 111 descends coupling the lower gear 94 of the bearing sleeve 93, to the upper gear 83 of the sprocket 82 of a bearing sleeve 80 transmitting its continuous rotation to the shaft 91 to rotate the tube T gripped by a gripping chuck mechanism which will be described in the following, during the following 10 positions, to ascend again in said tenth position at the upper section of the cam 104 interrupting the continuous rotation of the shaft 91 and in turn to the tube T, preparing it to the discharge position at the eleventh position;
  the bearing sleeve 93 is retained by a retaining roller 113 of a compensating mechanism 114, coupled at an end of the arm 111, to compensate the contraction and expanding length of the arm in the upper and lower positions;

Chuck carrier and operating means:
  twelve chuck carrier and operating mechanisms 120 (FIGS. 9A and 9B) to receive and grip the opened neck N of a tube T at the first position and get down and place its closed bottom B within a cut-off burner 51 at a third position to cut-off a leftover piece S thereof on advancing through the third position to the seventh position and then fire-finishing the cut-off end of the tube T, while traveling from the seventh position to the ninth position and finally lift it at the tenth position to prepare it to be discharged at the eleventh position, conditioning it at the twelfth position for commencing a new cut-off cycle at the first position;
  each of said chuck carrier and operating mechanisms 120 comprising a central chuck operating bar 121 slide passing through the hollow shaft 91 so that a section of its upper end protrudes from the, bearing sleeve 93 of the retaining mechanism 90 (FIG. 8);
  a hollow spacer sleeve 122 having an upper flange 123 to be coupled to the lower flange 95 of the hollow shaft 91 and a lower flange 124 to retain a chuck carrier 125;

chuck carrier 125 comprising an upper flange 126 to be coupled to the lower flange 124 of the spacer sleeve 122, and a lower flange 127 to retain a chuck mechanism 140 which will be described in the following, a spring 128 surrounding the chuck carrier 125, said spring 128 rests on a screwed flange 141 and is retained by its upper end by a removable pin 129 passing through a stop housing or groove 130 practiced in the chuck carrier 125, and through the chuck operating bar 121, retaining and normally pushing the chuck operating bar 121 upwards with an ascending force protruding the bearing sleeve 93;

Chuck means:

twelve cylindrical chuck mechanisms 140 each coupled to the lower flange 127 of the chuck carrier 125, having an inner hollow compartment 142 including three joint pins 143 (only two illustrated) equally distributed around the inner periphery thereof; a circular actuating plate 144 slide placed in the hollow compartment 142 of said cylindrical chuck 140 and centrally coupled to the lower end of said chuck operating bar 121 which is kept in an upper position within said hollow compartment by the effect of said spring 128, said actuating plate 144 having three gripping pins 145 and three gripping fingers 146 each having an oblique portion 147 having its free end coupled to a gripping pin 145, its middle portion 148 coupled to a joint pin 143 and a vertical portion 149 including a gripping pad 150 at its lower end; each of said gripping fingers 143 is coupled to a gripping pin 145 and to a joint pin 143, so that when the plate 144 is at an upper position by the ascending pushing force of said spring 128 applied to the chuck operating bar 121, the three gripping fingers are normally closed around the upper end of the tube T and, when said chuck operating bar 121 is pushed down by a chuck actuator 160 (which will be described in the following), pushing down in turn the plate 144 and consequently carrying down the gripping pins 145 journalizing the gripping fingers 146 on the joint pins 143, by which the gripping fingers 146 are consequently opened;

Chuck actuator means:

two chuck actuators 160 held to the periphery of the base 1, one placed at the first charging position and the other placed at the tenth discharging position; each of said chuck actuators 160 comprising a support frame 161 coupled to the base 1, having a support column 162; a support structure 163 coupled at the upper end of the column 162, including a pivot member 164 at its free upper end; a fluid motor 165 vertically coupled to the rear end of the support structure 163 having an upward operating piston rod 166; a horizontal working beam 167 having an actuating pad 168 at its forth end, the working beam 167 being mounted by its rear end 169 to the piston rod 166 and by its forth end 170 to the pivot member 164, in lever like fashion so that, when the fluid motor 165 is actuated by a coming fluid, the piston rod 166 lifts the rear end 169 of the working beam 167 which consequently gets down the actuating pad 168 which pushes dawn the central bar 121 of a chuck carrier 125 which reach to the first or tenth position, and which in turn pushes down the actuating plate 144 of the corresponding chuck mechanism 140 overcoming the lifting force of the spring 128 of the chuck carrier 125, and consequently opening the gripping fingers 146 of a chuck mechanism 140 and closing them after a few seconds, when the piston rod 166 is brought to its original lower position;

at the first charging position, one of the chuck actuators 160 operates over the central bar 121 of a chuck carrier 125 which is at said first charging position, opening the gripping fingers 146 to grip a tube T being fed at the first station, and then closing the fingers 146 around the opened neck N once the chuck pad 168 is no longer operating on said central bar 121;

similarly, the other of the chuck actuators 160 which is at the tenth discharge position operates to open the fingers 146 to loose a tube T at a known take over apparatus (not illustrated) which is not a part of this machine.

These chuck actuators 160, can be substituted by any other mechanism, mechanical or electronic, such as by means of well known rack-and-pinion or crank-and-rod or planetary gearing arrangements or by means of a reel valve including a piston, operated by solenoids, placed in the chuck carrier 125, to push the plate 144 to operate the gripping fingers 146.

Figure 9B:
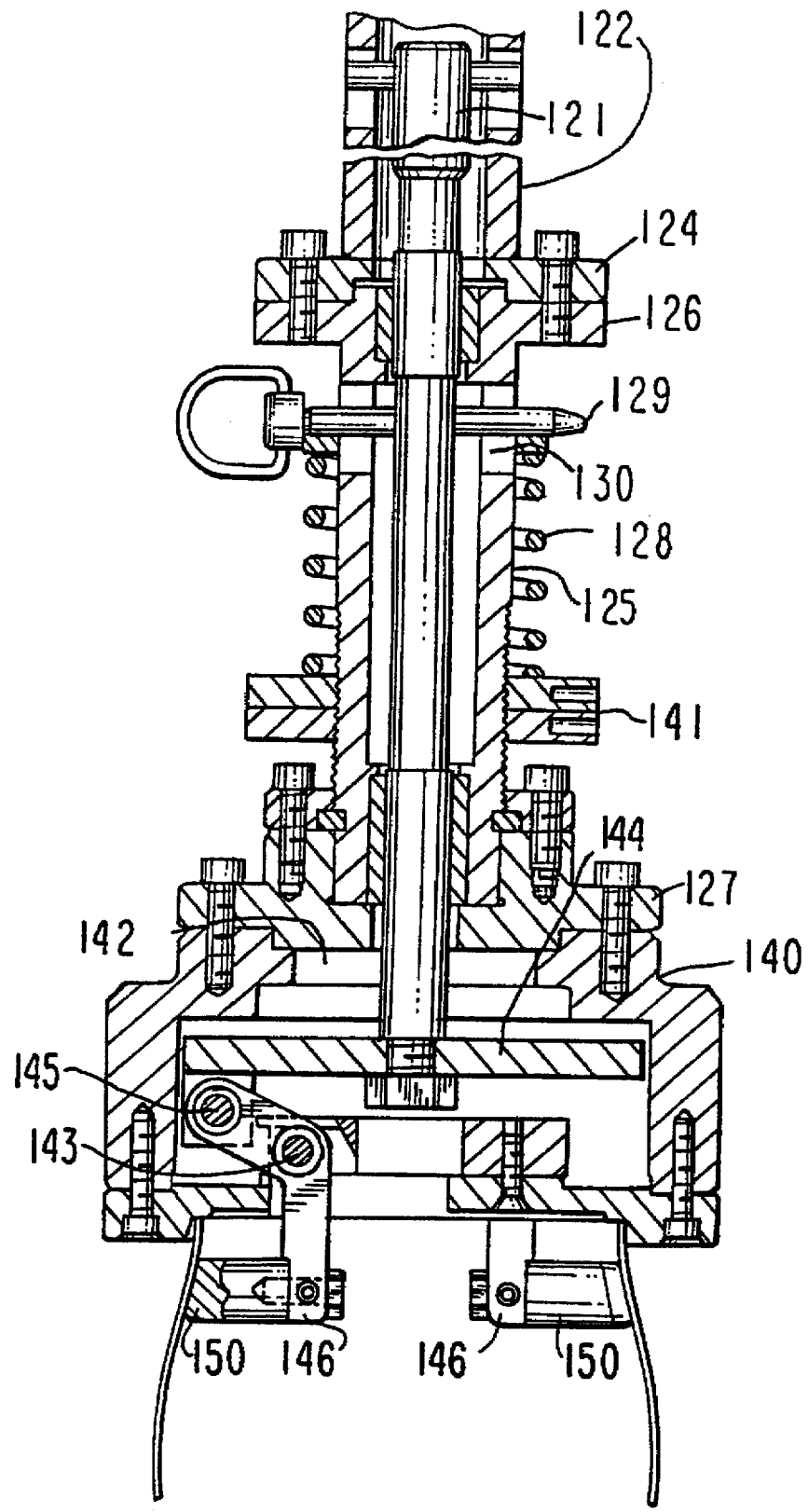
Figure 10:
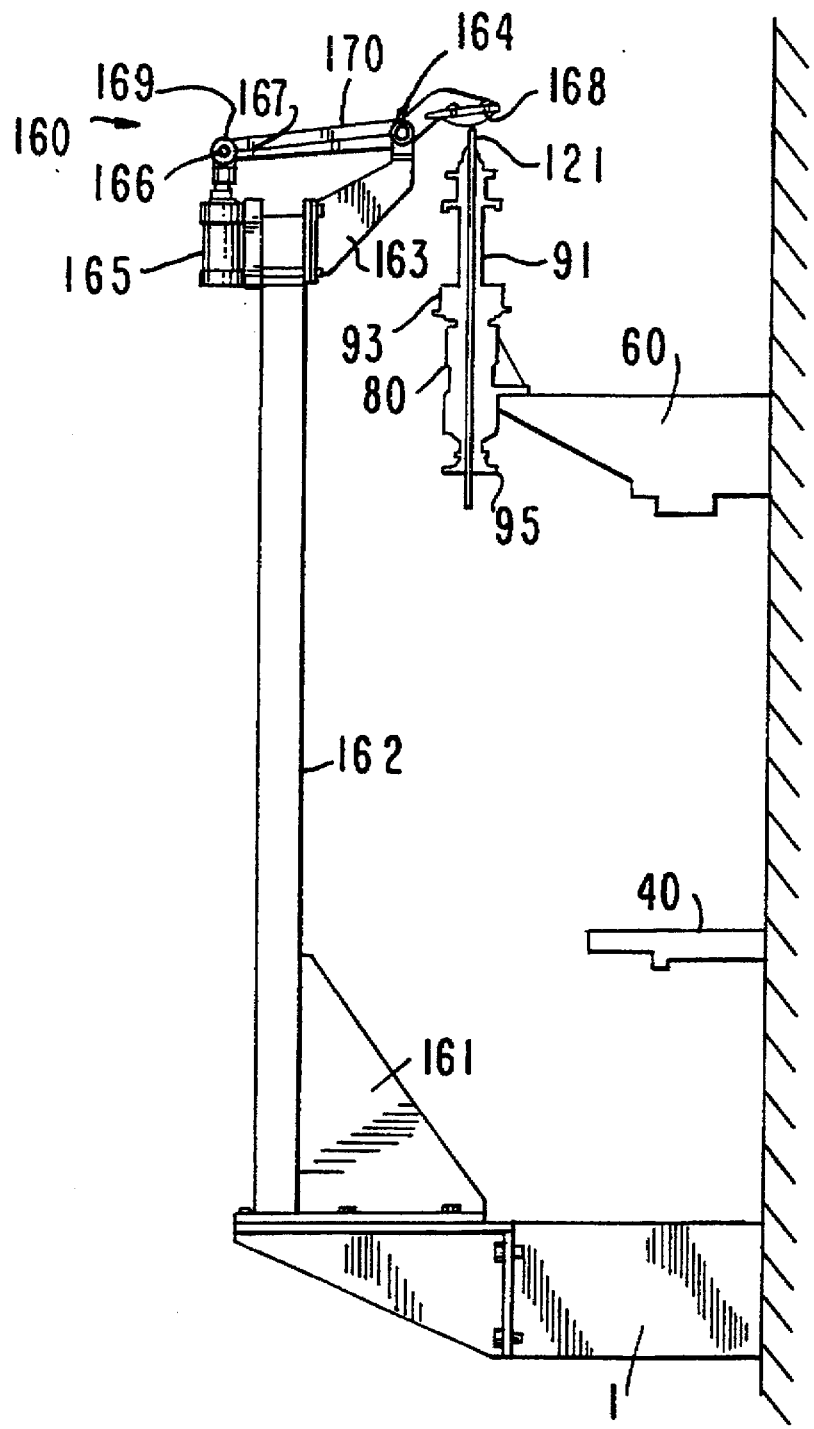
FIG. 10 is a schematic elevation view of one of the two chuck actuators of the machine of FIG. 4.

The chuck mechanism 140 can also be operated, as illustrated in FIG. 9B, by closing the gripping fingers 146 inwardly, so that it can be introduced into the opened end of a tube T and then loosen the gripping fingers 146' to grip the tube from the internal opened end thereof.

Similarly, the motor 71, transmission 72, cardan bar 73 and shaft 74 of the continuously driving means 70 can be taken from any driving source mounted outside the machine, just to drive the sprocket 76 to drive the chain 77 and operate the sprocket 82 and gear 83.

To charge a fresh article to the machine, it is convenient to charge it by means of a known charging apparatus, which has a receiving arm which firstly receives an article from a conveyor belt, then horizontally oscillates to a position corresponding to the charging position, ascends to place the article at a chuck mechanism 140 perpendicularly to the axes thereof, thereafter descends at said position and finally reaches to the conveyor belt.

It has to be understood that both the charging and take over apparatuses can conveniently be selected from those already known in the art.

Furthermore, it is understood that the machine to automatically cut-off one end of a hollow glassware article, in accordance with the present invention, can be used for sequentially cut-off both ends of a tubular hollow article and that the design and distribution of the specific component mechanisms of this machine may be redesigned in accordance with the teaching of the present invention and therefor will be within the scope of the invention claimed in the following claims.

What is claimed is:

1. A machine to automatically cutoff one end of a hollow glassware article, said machine comprising:

a support structure including a base and a vertical shaft having an upper end and a lower end centrally mounted on the base, and control means at the upper end of the vertical shaft to provide control and electrical energy to driving components of the machine;

intermittent driving means, rotary mounted on the vertical shaft providing a plurality of intermittent positions corresponding to article charging, cutoff, finishing and discharging positions;

a lower intermittent rotary table rotary mounted on the vertical shaft and coupled to the intermittent driving means to be driven thereby;

a plurality of one-piece cutoff burners, each equidistantly mounted on the periphery of said lower intermittent rotary table, to cutoff an excess piece of a lower end of said hollow glassware article and to finish the cut-off end thereof within a cutoff cycle;

an upper intermittent rotary table mounted on the vertical shaft and coupled to the lower intermittent rotary table to be driven thereby;

continuously rotary driving means mounted on the lower intermittent rotary table, including a motor mounted on the lower intermittent rotary table for imparting a continuous rotary movement, a shaft retained by a bearing sleeve mounted on the upper intermittent rotary table and coupled to the motor, a driving sprocket coupled to an upper end of said shaft, and a chain coupled to the sprocket to be continuously rotated by the sprocket;

a plurality of chuck driving means equidistantly mounted on the periphery of the upper intermittent rotary table, each chuck driving means comprising a bearing sleeve, a rotary sprocket mounted on the bearing sleeve which is coupled and continuously rotated by the chain, and a crown gear on the rotary sprocket;

a plurality of chuck actuating and gripping means equidistantly mounted proximate the periphery of the upper intermittent rotary table and comprising a shaft gripping sleeve having an annular gear at a lower end for engaging the crown gear of the chuck driving means, a central hollow shaft slide passing through and gripped by the shaft gripping sleeve, said slide gripping sleeve having coupling means at a lower end, and vertical reciprocate means operatively coupled to the shaft gripping sleeve to downwardly move the gripping sleeve to engage the annular gear with the crown gear and thereby transmit the continuous rotary movement to the hollow shaft and its coupling means, and lift said gripping sleeve to interrupt the rotary movement to said shaft gripping sleeve;

a plurality of chuck carrier and operating means, each comprising a central chuck operating bar slide passing through the hollow shaft of the chuck actuating and gripping means, a hollow spacer sleeve coupled to the coupling means of the hollow shaft, a chuck carrier coupled to the spacer sleeve, and a chuck operating means in the chuck carrier;

a plurality of chuck an inner hollow cod to a chuck carrier and having an inner hollow compartment including a plurality of joint pins around the inner periphery thereof, an actuating plate slide in the hollow compartment and centrally coupled to the lower end of the chuck operating bar, and having a plurality of gripping pins and a corresponding number of gripping fingers each finger having an oblique portion having a free end coupled to a gripping pin, a middle portion coupled to a joint pin and a vertical portion including a gripping pad at its lower end, so that when the plate is at an upper position, the gripping fingers are normally closed around the upper end of a hollow glassware article and when said chuck operating bar is pushed down by a chuck actuator, pushing down the plate of the chuck retaining mechanism, the gripping fingers are consequently opened; and chuck actuator means operable at the charging position and at the discharging position, each including driving means and a vertical reciprocal member operably coupled to the driving means to momentarily open and close the gripping fingers to release a hollow glassware article while it is at a discharging position, or to grip a hollow glassware article at the charging position.

2. The machine of claim 1, wherein the support structure comprises a circular pan for collecting cutoff pieces of the hollow glassware article and sending said cutoff pieces to a cullet deposit.

3. The machine of claim 1, wherein the intermittent driving means comprises a Geneva cam rotationally mounted on the vertical shaft, said cam having a plurality of slots corresponding to a plurality of positions of a cutoff cycle, to be actuated by a cam follower of a rotor rotationally mounted on the base and driven by a motor, whereby the Geneva cam transforms the continuously rotary motion provided by the rotor to an intermittent rotary motion each time that the cam follower of the rotor is coupled to each of the slots of said Geneva cam.

4. The machine of claim 1, wherein the lower intermittent rotary table is rotationally mounted at an intermediate position on the vertical shaft and is rotationally coupled to said Geneva cam to be intermittently rotated thereby, and a sweep plate coupled to the table to sweep out the cutoff pieces from the pan to send them to a cullet deposit.

5. The machine of claim 1, wherein the cutoff burners mounted on the lower intermittent rotary table comprise a plurality of burner carriers equally spaced and mounted on the periphery of the lower intermittent rotary table, each burner carrier including an annular cutoff burner connected to a gas source, each of said burners providing an annular flame to cut off an excess piece from a hollow glassware article and to fire-finish the cutoff end of said article.

6. The machine of claim 1, wherein the upper intermittent rotary table is mounted near the upper end of the vertical shaft, and is coupled to the lower intermittent rotary table.

7. The machine of claim 1, wherein the continuously rotary driving means includes a motor mounted on the lower intermittent rotary table, a reducer and a cardan bar to transmit the continuously rotary movement of the motor to a shaft retained by a bearing sleeve mounted on the upper intermittent rotary table to a driving sprocket coupled to an upper end of the shaft, and to a chain which is maintained in tension by a tension adjusting gear supported by the bearing sleeve.

8. The machine of claim 1, wherein the continuously rotary driving means includes a sprocket continuously driven from an outside location of the machine, a chain coupled to the sprocket, and a tension adjusting gear supported by the bearing sleeve, whereby the chain is continuously rotated.

9. The machine of claim 1, wherein the chuck driving means includes a plurality of chuck driving beating sleeves mounted equidistantly on the periphery of said upper table, and a rotary sprocket rotary mounted on the bearing sleeve, which sprocket is coupled to and continuously rotated by the chain, and a crown gear on the rotary sprocket.

10. The machine of claim 1, wherein each of the vertical reciprocate means includes a hollow support column mounted near the periphery of the upper rotary table for retaining a horizontal sliding sleeve at its upper end, a horizontal cam follower passing through said sleeve, a rotary cam having a circular edge profile provided with peak section and a lower section for providing a cutoff cycle to the machine; the cam follower includes a pivot to which is coupled a spring held by a spring carrier coupled to the support column; a support roller bearing at about the middle part the cam follower to transmit the horizontal sliding movement of said cam follower; a support column centrally retained within said hollow support column having a joint at an upper end; a support arm mounted for articulation on said joint and having a trigger resting against the support roller bearing of the cam follower, said support arm provided with a bearing for supporting the central hollow shaft of said chuck retaining mechanism, whereby when said cam follower is following the upper section of the cam to pick up an article, the arm is at an upper position and, when the cam follower reaches the lower section of the cam at another position of the cutoff cycle, the arm descends coupling the annular gear of the bearing sleeve to the crown gear of the sprocket of a bearing sleeve to thereby transmit its continuous rotation to the shaft to rotate an article gripped by a gripping chuck mechanism during the following positions, and to ascend again in a following position at the upper section of the cam interrupting the continuous rotation of the hollow shaft and the article, advancing it to the discharge position and the beating sleeve is retained by a retaining roller of a compensating mechanism, coupled at an end of the support arm, to compensate the contraction and expanding length of the arm in the upper and lower positions.

11. The machine of claim 1, wherein each of the chuck carrier and operating means comprises a central chuck operating bar slide passing through the hollow shaft of the chuck actuating and operating means, where a section of the upper end of said bar slide protrudes from the bearing sleeve of the retaining mechanism; a hollow spacer sleeve having an upper flange to be coupled to a lower flange of the hollow shaft and a lower flange to retain a chuck carrier, said chuck carrier comprising an upper flange to be coupled to the lower flange of the spacer sleeve, and a lower flange to retain a chuck mechanism; a spring surrounding the chuck carrier and resting on the lower flange of the chuck carrier and retained by its upper end by a removable pin passing through a stop housing in the chuck carrier and through the chuck operating bar, retaining and normally pushing the chuck operating bar upwards with an ascending force extending the bearing sleeve.

12. The machine of claim 1, wherein each of the chuck means comprises a plurality of cylindrical chuck mechanisms, each chuck mechanism having a flange coupled to the lower flange of the chuck carrier and an inner hollow compartment including a plurality of joint pins equally distributed around the inner periphery thereof; a circular actuating plate slide positioned in the hollow compartment of said cylindrical chuck and centrally coupled to the lower end of said chuck operating bar, said actuating plate having a plurality of gripping pins and a corresponding number of gripping fingers, each finger having an oblique portion having its free end coupled to a gripping pin, a middle portion coupled to a joint pin and a vertical portion that includes a gripping pad at its lower end; each of said gripping fingers being coupled to a gripping pin and to a joint pin whereby when the plate is at an upper position, the gripping fingers are closed around the upper end of a hollow glassware article and when said plate of the chuck mechanism is moved down said fingers open.

13. The machine of claim 1, wherein each of the chuck actuator means are secured to the periphery of the base, each of said chuck actuator means comprising a support frame coupled to the base, a support column, a support structure coupled at an upper end of the column, said support structure including a pivot member at a free upper end thereof; a fluid motor vertically coupled to a rear end of the support structure and provided with an upward operating piston rod; a horizontal working beam having an actuating pad at its forward end, the working beam being mounted by its rear end to the piston rod and by its forward end to the pivot member, whereby when the fluid motor is actuated, the piston rod lifts the rear end of the working beam which consequently lowers the forward end causing the actuating pad to push down the central bar of a chuck carrier, and which in turn pushes down the actuating plate of the corresponding chuck mechanism to open the gripping fingers of the chuck mechanism and then to close said finger, when the piston rod is brought to its original lower position at the charging or discharging positions to grip and release a hollow glassware.

14. The machine of claim 1, wherein each of the chuck actuator means includes a driving mechanism selected from the group consisting of a rack-and-pinion gear, crank-and-rod and planetary gearing arrangement.

15. The machine of claim 1, wherein each of the chuck actuator means includes a reel valve including a solenoid-operated piston placed in the chuck carrier.

* * * * *